United States Patent [19]

Lee et al.

[11] Patent Number: 6,074,974

[45] Date of Patent: Jun. 13, 2000

[54] MANUFACTURING METHOD OF GRANULATED COMPLEX MOLECULAR SIEVE COMPOSITION HAVING MULTI-FUNCTIONS

[75] Inventors: Jung-Min Lee; Jeong-Kwon Suh; Soon-Yong Jeong; Hang-Kyo Jin; Byung-Ki Park, all of Daejeon; Chun-Hee Park, Seoul; Jeong-Hwan Park, Daejeon; Si-Wang Kim, Seoul; Jong-An Kim, Daejeon; Yeoun-Kee Park, Seoul; Chang-Whan Lim, Daejeon, all of Rep. of Korea

[73] Assignee: Korea Research Institute of Chemical Technology, Daejon, Rep. of Korea

[21] Appl. No.: 09/000,220

[22] PCT Filed: Dec. 30, 1995

[86] PCT No.: PCT/KR95/00188

§ 371 Date: Aug. 14, 1998

§ 102(e) Date: Aug. 14, 1998

[87] PCT Pub. No.: WO97/04865

PCT Pub. Date: Feb. 13, 1997

[30] Foreign Application Priority Data

Jul. 31, 1995 [KR] Rep. of Korea .................. 95-23319

[51] Int. Cl.⁷ .................................................. B01J 29/06
[52] U.S. Cl. ......................... 502/64; 502/63; 502/416; 502/417
[58] Field of Search .......................... 502/63, 64, 417, 502/416

[56] References Cited

U.S. PATENT DOCUMENTS

| | | | |
|---|---|---|---|
| 3,382,187 | 5/1968 | Drost et al. | 502/64 |
| 3,868,299 | 2/1975 | Ulisch et al. | 502/64 |
| 4,594,332 | 6/1986 | Hoelderich et al. | 502/64 |
| 4,613,578 | 9/1986 | Hertzenberg | 502/64 |
| 4,791,082 | 12/1988 | Dorr et al. | 502/65 |
| 5,716,899 | 2/1998 | Guile et al. | 502/439 |

FOREIGN PATENT DOCUMENTS

| | | |
|---|---|---|
| 0 170 026 | 2/1986 | European Pat. Off. . |
| 0 570 847 A1 | 11/1993 | European Pat. Off. . |
| 94-18327 | 2/1996 | Rep. of Korea . |

OTHER PUBLICATIONS

Japanese Non–Examination Patent Sho 54–53669 dated Apr. 27, 1979.

*Primary Examiner*—Tom Dunn
*Attorney, Agent, or Firm*—Finnegan, Henderson, Farabow, Garrett & Dunner, L.L.P.

[57] ABSTRACT

The present invention relates to a manufacturing method of granulated complex molecular sieve composition having multifunction and useful for removal agent of harmful gas of cigarette or treatment agent of water purification etc. as having multifunctioned adsorption capacity and excellent anti-abrasion property, and convenient process, in particular, to a manufacturing method which is comprised of granulating by mixing alkali metal silicate aqueous solution to mixture of zeolites of various types and active carbon and treating it with water solution of alkali earth metal salt without calcination, and drying.

4 Claims, No Drawings

MANUFACTURING METHOD OF GRANULATED COMPLEX MOLECULAR SIEVE COMPOSITION HAVING MULTI-FUNCTIONS

FIELD OF THE INVENTION

The present invention relates to a method of manufacturing granulated complex molecular sieve compositions having multi-functions, which can be used, for example, to remove harmful gases that are emitted from cigarettes or as a treatment agent in water purification. The present molecular sieve compositions also have a multi-adsorption capacity, an excellent anti-abrasion property and can be conveniently processed. In particular, the inventive method comprises granulating an alkali metal silicate aqueous solution with a mixture of zeolites of various types and active carbon powder, and treating the mixture with an aqueous solution of alkali earth metal salt without calcination and drying.

DESCRIPTION OF THE RELATED ART

Zeolite is a crystalline alumino silicate salt generally represented by the following formula (I).

$$M_{x/n}[AlO_2)_x(SiO_2)_y]wH_2O \qquad (I)$$

wherein, M is a cation,
n is the cation valence,
w is the number of water molecules.

The rate of y/x usually has values of 1~5 depending upon the structure.

The minute pore diameter of approximately 3 to 10 Å, that is characteristic of most zeolites, results in molecular sieving properties. Zeolites are especially useful as a hydrophilic adsorbent, because they have a strong adsorption capacity with polar molecules such as water. In addition, their adsorption capacity is great even under low partial pressures and at high temperatures.

An active carbon is manufactured by a method comprising the carbonization of materials that include coconut husk, coal or wood. Activation is then carried out under a reduction atmosphere. The resulting active carbon has a granule, fragment or powder morphology, and a pore diameter of 1 to 100 nm, with most pores being below 2 nm. Active carbon is a hydrophobic adsorbent and has strong adsorption power with non-polar molecule. The specific surface area of the active carbon may exceed 1200 m²/g.

To assist in the adsorption capacity of the hydrophilic adsorbent of zeolite and the hydrophobic adsorbent active carbon, methods of manufacturing such adsorbents having multi-functions have been recently reported. These methods include mixing zeolite and active carbon, combining active carbonization substance and substance of zeolite type, and mixing a silicate compound and active carbon.

For example, Japanese non-examination patent sho 54-53669 discloses a method of manufacturing a composition for ozon degradation by adding bentonite and sugar to a mixture of zeolite and active carbon, which is then formed, dried and calcined. This method uses a natural clay such as bentonite as an inorganic binder. Consequently, the final product includes adulterated impurities. In addition, because the natural clay binder is a water-insoluble compound, its plasticity becomes low when it is mixed with water. To form a desired pattern, therefore, its plasticity must be maintained by adding water-soluble compounds such as polymers as an organic binder. Furthermore, due to the swelling of bentonite in water, the composition readily dissolves in water. To prevent the composition from dissolving and to carbonize sugar as an organic binder, a drying process and a calcination process under reduction atmosphere is required.

Therefore, this method needs complex calcination equipment which results in enormous costs. This method also produces dust, because of the contraction of bentonite during calcination, which leads to a decrease in the anti-abrasion capability and in the adsorption capability (because of the decrease in specific surface area) of the product. Use of an organic binder also necessarily results in contamination to the atmosphere from the volatile oils that are produced during the carbonization of the organic binder. Accordingly, this method requires a system to remove such contaminative substances.

Japanese non-examination Patent Pyong 4-4039 discloses a method of manufacturing a wastewater treatment agent using oil-adsorption capability by adding blast furnace slag powder to zeolite. This method gives rise to ecological safety problem of using the blast furnace slag component. Also, the bad plasticity associated with using the slag component makes the granulation process difficult. Moreover, the resulting product's hydrophobic adsorption capability is low.

Japanese non-examination patent sho 59-69146 discloses a method of manufacturing an adsorbent of filter phase by adding bentonite and silicate compounds to active carbon. This method has a problem with the pore of active carbon becoming plugged by the bentonite and silicate compounds, which results in a low hydrophilic adsorption capability for the molecular sieve.

To overcome the problems of the above prior art, the inventors have developed a product having improved plasticity and anti-abrasion capabilities. This improved product was initially made by adding alkali earth metal silicate as an inorganic binder and molasses as organic binder to a mixture of zeolite and active carbon. See, Korean patent application 94-18327. However, this process also required a calcination step, which lead to the previously described problems, i.e., limitations in improvement of adsorption capability and specific surface area.

Therefore, the inventors attempted to solve the problems described in the prior art by using a method that did not require high temperature calcination. As a result, the inventors developed a method comprising (a) manufacturing a granulated composition by adding an alkali metal silicate aqueous solution having good plasticity to a mixture of zeolite and active carbon, (b) and adding the composition directly to an alkali earth metal salt aqueous solution without drying or calcinating.

The inventors have discovered that the water-soluble alkali metal silicate is converted into water-insoluble alkali earth metal silicate, even without separately using an organic binder. Therefore, anti-abrasion capability of the granulated composition increases without the composition dissolving in water. The use of the inorganic binder also increases adsorption capability. Moreover, because zeolite contained in the granulated compositions is converted into zeolite of alkali earth metal type, the specific surface area of the granulated compositions is also greatly improved.

The objection of the present invention is to provide a method of manufacturing a granulated complex molecular sieve composition having multi-functions, such as the adsorption of water and organic solvent, or the separation of substances.

SUMMARY OF THE INVENTION

The present invention relates to a method of manufacturing a granulated complex molecular sieve composition which comprises the steps of adding alkali metal silicate aqueous solution to a mixture of zeolite and active carbon powder. The mixture is then granulated and soaked with an alkali earth metal salt aqueous solution. The following is a more detailed description of the invention.

This invention relates to a method of manufacturing a granulated complex molecular sieve composition having various adsorption capability by developing micropores.

Zeolite powder of A type and active carbon powder is first added together, and then placed in a plowshare mixer where it is sufficiently mixed. An alkali metal silicate aqueous solution is then sprayed on the zeolite and active carbon, mixed and granulated to a size of 0.2 to 5 nm. Besides zeolite of A type, other zeolites that can be used include X, Y, or ZSM type or natural zeolite.

In this invention, the active carbon is manufactured from coconut husk, and it is a powder type having a specific surface area of greater than 100 $m^2/g$. An active carbon of lignite series, soft coal series, or wood type can also be used.

As the alkali metal silicate aqueous solution, sodium silicate aqueous solution or potassium silicate aqueous solution is used. When sodium silicate aqueous solution is used, the aqueous solution contains 15 to 38 wt % of sodium silicate. In addition to a plowshare mixer, other granulation equipment that can be used includes a rotating granulator, an extruder, a fluidized bed granulator or a tablet press.

When the granulated composition is added to an alkali earth metal salt aqueous solution, the alkali metal silicate component, which acts as a binder, is converted into alkali earth metal silicate. For example, zeolite of 4A type is simultaneously converted into zeolite of alkali earth metal A type. The granulated complex molecular sieve composition of the present invention is produced by removing the liquid component of the solution by drying with a fluidized bed dryer. As the alkali earth metal aqueous solution, the present invention can utilize calcium chloride($CaCl_2$) aqueous solution or magnesium chloride($MgCl_2$,) aqueous solution. When calcium chloride aqueous solution is used, the aqueous solution contains 10 to 45 wt % of calcium chloride. The detailed chemical reactions that occur in zeolite and silicate when the granulation composition is treated with alkali earth metal salt, e.g., $CaCl_2$, are as follows:

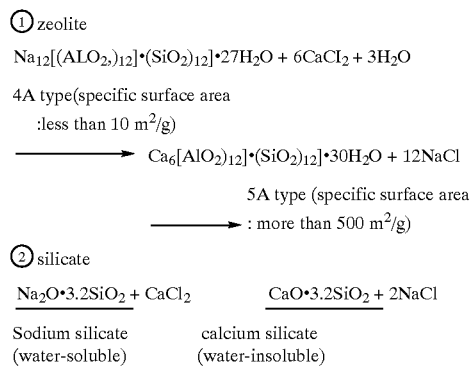

As mentioned above, this invention has the advantage that the pretreatment process in which zeolite powder is converted into alkali earth metal zeolite powder is not required. In other words, by using water-insoluble alkali earth metal silicate in the inventive process, binding power and water resistant property of the granulated composition is greatly improved, without the need for high temperature calcination.

The granulated complex molecular sieve composition manufactured according to the present invention is composed of 20 to 60 wt % of zeolite, 15 to 50 wt % of active carbon and 10 to 35 wt % of alkali earth metal silicate, as solid components. When the content of these components are above or below these ranges, it is difficult to have desired hydrophobic/hydrophilic adsorption capability and to manufacture a granulated composition having the desired anti-abrasion capability. Also, when the components are outside these ranges adsorption capability is decreased because of the severe plugging of the micropores by the adsorbent.

The properties associated with the granulated composition include a specific surface area greater than $500m^2/g$, an iodine adsorption power greater than 320 mg/g, a decoloration power of methylene blue greater than 65 mg/g, and an anti-abrasion capability greater than 99.5%. Consequently, the granulated composition of this invention has excellent plasticity and anti-abrasion capability, without the need for a calcination step. In addition, the adsorption capability of the composition is not adversely affected by the presence of an organic binder.

The granulated composition is useful for adsorption of water, organic solvents and poisonous gas. The composition can also be used in the treatment of service water and sewage and for the separation of substances using the molecular sieve properties of the composition. In particular, the inventive composition can be used as a treatment agent for water purification or air purification, a deodorization agent or as a catalyst and support for adsorbents. The present invention is represented by the Examples below, which are intended to be exemplary only.

EXAMPLE 1

13.0 kg of zeolite powder of 4A type(water content: 5.6 wt %) and 6.5 kg of active carbon powder(water content: 6.2 wt %) were added to a plowshare mixer of 130 l capacity (Germany, Lödige) and mixed for 6 minutes at a spindle rotating speed of 200 rpm and a chopper rotating speed of 1300 rpm.

A solution was prepared by mixing 12.5 kg of sodium silicate aqueous solution (K.S standard, water glass No. 3) with 2.5 kg of water, which was injected by a nozzle into the mixture for 8 minutes. The mixture was further mixed and then granulated for 15 minutes, which resulted in a granulated composition having an average diameter of 1.2 nm. The granulated composition was added to a water solution that was at 75° C. 6.2 kg of calcium chloride was added to 16.0 kg of water and dissolved. After the composition was treated for 1 hour, the solution was filtered through a sieve of 60 mesh and the filtered liquid was removed. 15.0 kg of water that was at 70° C. was twice added to residue material and washed, and dried with fluidized bed dryer of 90° C. 24.1 kg of granulated complex molecular sieve composition (water content: 4.3 wt %) was acquired. The physical properties of the composition are provided in the table.

EXAMPLE 2

10.0 kg of zeolite powder of 4A type(water content: 5.6 wt %) and 9.5 kg of active carbon powder(water content: 6.2 wt %) were added to a plowshare mixer of 130 l capacity (Germany, Lödige) and mixed for 6 minutes at a spindle rotating speed of 200 rpm and a chopper rotating speed of 3600 rpm.

A solution was prepared by mixing 13.0 kg of sodium silicate aqueous solution(K.S standard, water glass No. 3) with 3.2 kg of water, which was injected by a nozzle into the mixture for 8 minutes. The mixture was further mixed, and then granulated for 15 minutes, which resulted in a granulated composition having an average diameter of 1.3 nm. The granulated composition was added to water solution that was at 75° C. 5.6 kg of calcium chloride was added to 16.0 kg of water and dissolved. After the composition was treated for 1 hour, the solution was filtered through a sieve of 60 mesh and the filtered liquid was removed. 15.0 kg of water at 70° C. was twice added to residue material and washed, and dried with fluidized bed dryer of 90° C. 24.3 kg of granulated complex molecular sieve composition (water content: 4.5 wt %) was acquired. The physical properties of the composition are provided in the table.

EXAMPLE 3

15.0 kg of zeolite powder of.4A type(water content: 5.6. wt %) and 4.5 kg of active carbon powder(water content: 6.2 wt %) were added to a plowshare mixer of 130 l capacity (Germany, Lödige) and mixed for 6 minutes at a spindle rotating speed of 200 rpm and a chopper rotating speed of 3600 rpm.

A solution prepared by mixing 11.3 kg of sodium silicate aqueous solution(K.S standard, water glass No. 3) with 2.3 kg of water, which was injected into the mixture for 8 minutes by a nozzle. The mixture was further mixed and granulated for 15 minutes, which resulted in a granulated composition having an average diameter of 1.1 nm. The granulated composition was added to water solution that was at 75° C. 6.5 kg of calcium chloride was added to 16.0 kg of water and dissolved. After the composition was treated for 1 hour, the solution was filtered through a sieve of 60 mesh and the filtered liquid was removed. 15.0 kg of water at 70° C. was twice added to residue material and washed, and dried with fluidized bed dryer of 90° C. 23.8 kg of granulated composite molecular sieve composition (water content: 4.1 wt %) was acquired. The physical properties of said composition are provided in the table.

COMPARATIVE EXAMPLE 1

9.9 kg of zeolite powder of 4A type was added to 25.0 kg of calcium chloride aqueous solution containing 18 wt % of calcium chloride and stirred at 70° C., for 2 hrs. The mixture was then ion-exchanged, filtered, washed, and dry-sprayed at 120° C. 10.0 kg of zeolite powder of 5A type was acquired. The resulting pre-treated zeolite of 5A type, 7.5 kg of active carbon powder and 7.5 kg of magnesium silicate powder were added to a plowshare mixer and mixed for 6 minutes. A solution of 2.5 kg of molasses and 5.0 kg of water was spray-injected into the mixture for 1 to 3 minutes by a nozzle. The mixture was treated for 30 minutes. 24.2 kg of granulated composition having 1.5 nm of average diameter was acquired.

The composition was dried at 120° C. for 3 hrs with convection-type dryer, and then calcined at 650° C. for 2 hrs under a nitrogen atmosphere. The physical properties of the composition manufactured using the process is provided in the table.

COMPARATIVE EXAMPLE 2

A composition was next made using the same method as COMPARATIVE EXAMPLE 1. However, calcium silicate was used instead of magnesium silicate. The physical properties of the composition are provided in the table.

COMPARATIVE EXAMPLE 3

10 kg of zeolite powder of 5A type treated by the same method as described in COMPARATIVE EXAMPLE 1. 7.5 kg of active carbon powder and 7.5 kg of magnesium silicate powder were added to a plowshare mixer and mixed for 6 minutes. A solution comprising 2.0 kg of molasses and 4.9 kg of water was spray-injected into the mixture for 30 minutes by a nozzle. A granulated composition having an average diameter of 1.1 nm was acquired. The surface of the granulated composition was coated by a solution of 0.5 kg of molasses and 0.13 kg of water that was spray-injected into said composition by a nozzle. The remainder of the process was carried out by same method described in COMPARATIVE EXAMPLE 1. The physical properties of the composition are provided in the table.

COMPARATIVE EXAMPLE 4

Besides the use of bentonite instead of magnesium silicate powder, and sugar instead of theriac, the composition according to this example was manufactured using the same method described in COMPARATIVE EXAMPLE 1. The physical properties of the composition are provided in the following table.

TABLE

|  | | Property | | | |
|---|---|---|---|---|---|
| Example | | Specific Surface Area$^{(1)}$($m^2$/g) | Adsorption Capacity of Iodine$^{(2)}$(mg/g) | Decoloration Capacity of Methylene blue$^{(3)}$(mg/g) | Anti-abrasion Capability$^{4}$(%) |
| EXAMPLE | 1 | 610 | 405 | 79 | 99.8 |
|  | 2 | 730 | 430 | 86 | 99.8 |
|  | 3 | 585 | 398 | 77 | 99.9 |
| COMPARATIVE | 1 | 570 | 390 | 75 | 99.6 |
| EXAMPLE | 2 | 565 | 390 | 73 | 99.5 |
|  | 3 | 560 | 388 | 76 | 99.8 |
|  | 4 | 430 | 310 | 60 | 98.2 |

Note:
$^{(1)}$Specific Surface Area: After the sample was sufficiently degassed at about 350° C., an adsorption isotherm of nitrogen was acquired under temperature of liquid nitrogen. Specific surface area was calculated using the BET equation.
$^{(2)}$Adsorption Capacity of Iodine: After an iodine aqueous solution is added to the sample and adsorbed into the sample, the liquid was separated by filtration. Starch solution was added to the filtrate as an indicator. The amount of iodine adsorbed into the sample was calculated from iodine concentration of filtrate by titrating with sodium thiosulfate.
$^{(3)}$Decoloration Capacity of Methylene blue: Methylene blue aqueous solution was added to sample, and then shaken and filtered. The chromaticity of filtrate was compared with that of standard methylene blue solution, and decoloration capacity of methylene blue was calculated from the amount of methylene blue required to make it consistent with color of the standard methylene blue solution.
$^{(4)}$Anti-abrasion capability: 1 kg of sample was put into an attrition-abrasion tester and rotated at 60 rpm for 30 minutes, and filtered through standard sieve of 100 mesh. Weight(w) of the separated particle was acquired and anti-abrasion capacity was calculated from the following equation. anti-abrasion capability(%) (1 − w) × 100.

What is claimed is:

1. A method of manufacturing a granulated complex molecular sieve composition having multi-functions, said method comprising the steps of:

spray-adding an alkali metal silicate aqueous solution to a mixture of zeolite and active carbon powder, granulating the aqueous solution containing mixture, treating the granulated aqueous solution containing mixture with an alkali earth metal salt aqueous solution, and drying.

2. The method according to claim 1, wherein said zeolite is 4A type.

3. The method according to claim 1, wherein said alkali metal silicate aqueous solution contains 15 to 38 wt % of sodium silicate.

4. The method according to claim 1, wherein said alkali earth metal salt aqueous solution contains 10 to 45 wt % of calcium chloride.

* * * * *

UNITED STATES PATENT AND TRADEMARK OFFICE

CERTIFICATE OF CORRECTION

PATENT NO. 6,074,974

DATED: June 13, 2000

INVENTORS Jung Min LEE et al.

It is certified that errors appear in the above-identified patent and that said Letters Patent is hereby corrected as shown below:

IN THE CLAIMS:

Claim 1, Col. 7, line 37, "treating" should align with --granulating-- above in line 37; and
Claim 1, Col. 7, line 39 "drying" should be a new line, aligning with --granulating -- above in line 36.

Signed and Sealed this

Twenty-fourth Day of April, 2001

Attest:

NICHOLAS P. GODICI

Attesting Officer

Acting Director of the United States Patent and Trademark Office